US010152989B1

(12) United States Patent
Brown et al.

(10) Patent No.: US 10,152,989 B1
(45) Date of Patent: Dec. 11, 2018

(54) MONITORING USING A MOBILE DEVICE ACCESSORY

(71) Applicant: comScore, Inc., Reston, VA (US)

(72) Inventors: Michael A. Brown, Ashburn, VA (US); Magid M. Abraham, Great Falls, VA (US)

(73) Assignee: comScore, Inc., Reston, VA (US)

( * ) Notice: Subject to any disclaimer, the term of this patent is extended or adjusted under 35 U.S.C. 154(b) by 0 days.

(21) Appl. No.: 14/619,383

(22) Filed: Feb. 11, 2015

(51) Int. Cl.
| G06F 17/00 | (2006.01) |
| G10L 25/72 | (2013.01) |
| G06F 17/30 | (2006.01) |
| H04N 21/25 | (2011.01) |
| H04N 21/41 | (2011.01) |

(52) U.S. Cl.
CPC ........ *G10L 25/72* (2013.01); *G06F 17/30743* (2013.01); *H04N 21/251* (2013.01); *H04N 21/4126* (2013.01)

(58) Field of Classification Search
CPC ......... G10L 25/72; G10L 25/48; G10L 25/03; G06F 17/30026; G06F 17/30743; H04B 1/3888
See application file for complete search history.

(56) References Cited

U.S. PATENT DOCUMENTS

| 2012/0029670 A1* | 2/2012 | Mont-Reynaud .......... G06F 17/30026 700/94 |
| 2014/0273822 A1* | 9/2014 | Gutierrez .............. H04W 76/10 455/41.1 |
| 2015/0270734 A1* | 9/2015 | Davison ................ H02J 7/0054 320/103 |
| 2015/0280669 A1* | 10/2015 | Vilermo ................. H04R 5/033 381/107 |

\* cited by examiner

*Primary Examiner* — Fan Tsang
*Assistant Examiner* — David Siegel
(74) *Attorney, Agent, or Firm* — Baker & Hostetler LLP

(57) ABSTRACT

Methods, systems, and apparatus, including computer programs encoded on computer storage media, for audience measurement using a mobile device accessory are disclosed. In one aspect, a mobile device accessory includes a power source configured to provide power to the mobile device. The mobile device accessory further includes an audio capturing device configured to capture an ambient sound, and a microprocessor coupled to the audio capturing device and configured to identify distinctive features of the ambient sound and generate a digital representation of the ambient sound. The mobile device accessory further includes a memory coupled to the microprocessor and configured to store at least the digital representation, and a transmitter coupled to the microprocessor and configured to transmit at least the digital representation.

20 Claims, 4 Drawing Sheets

US 10,152,989 B1

MONITORING USING A MOBILE DEVICE ACCESSORY

BACKGROUND

Audience measurement may be useful for a number of reasons. For example, some organizations may want to be able to make claims about the size and growth of their audiences, such as, for example, to entice advertisers to buy advertising space in their presented content.

SUMMARY

In a first implementation, a system includes a mobile device and an accessory coupled to the mobile device. The accessory includes a power source configured to provide power to the mobile device; an audio capturing device configured to capture an ambient sound; a microprocessor coupled to the audio capturing device and configured to identify distinctive features of the ambient sound and generate a digital representation of the ambient sound; a memory coupled to the microprocessor and configured to store at least the digital representation; and a transmitter coupled to the microprocessor and configured to transmit at least the digital representation. The system also includes a software application suitable to be executed on the mobile device and, when executed, to cause the mobile device to receive information transmitted by the transmitter and further transmit the received information for analysis. The system also includes a collection server. The collection server is configured to receive the information transmitted by the software application, and determine, based on the transmitted information, that a user associated with the mobile device case was exposed to a particular piece of media content.

Other implementations of these aspects include corresponding apparatus, systems, and computer programs recorded on one or more computer storage devices, each configured to perform the actions of the methods. One or more of the each component described above can be configured to perform particular operations or actions. One or more software programs can be configured to perform particular operations or actions by virtue of including instructions that, when executed by a data processing apparatus, cause the system to perform the actions.

These implementations may include one or more of the following features. For example, the microprocessor may be configured to generate an audio fingerprint of the ambient sound as the digital representation. Additionally or alternatively, the microprocessor is configured to periodically cause the transmitter to transmit one or more digital representations to an application executing on the mobile device. Additionally or alternatively, the power source may be configured to provide power to the audio capturing device, the microprocessor, the memory, and the transmitter. Additionally or alternatively, the microprocessor may be configured to select between one of multiple algorithms that convert ambient sound into a digital representation, and generate the digital representation of the ambient sound based on the selected algorithm. Additionally or alternatively, the software application, when executed, may cause the mobile device to transmit information about the mobile device with the received information.

The details of one or more implementations are set forth in the accompanying drawings and the description below.

Other features, aspects, and advantages will become apparent from the description, the drawings, and the claims.

DETAILED DESCRIPTION

Figure 1:
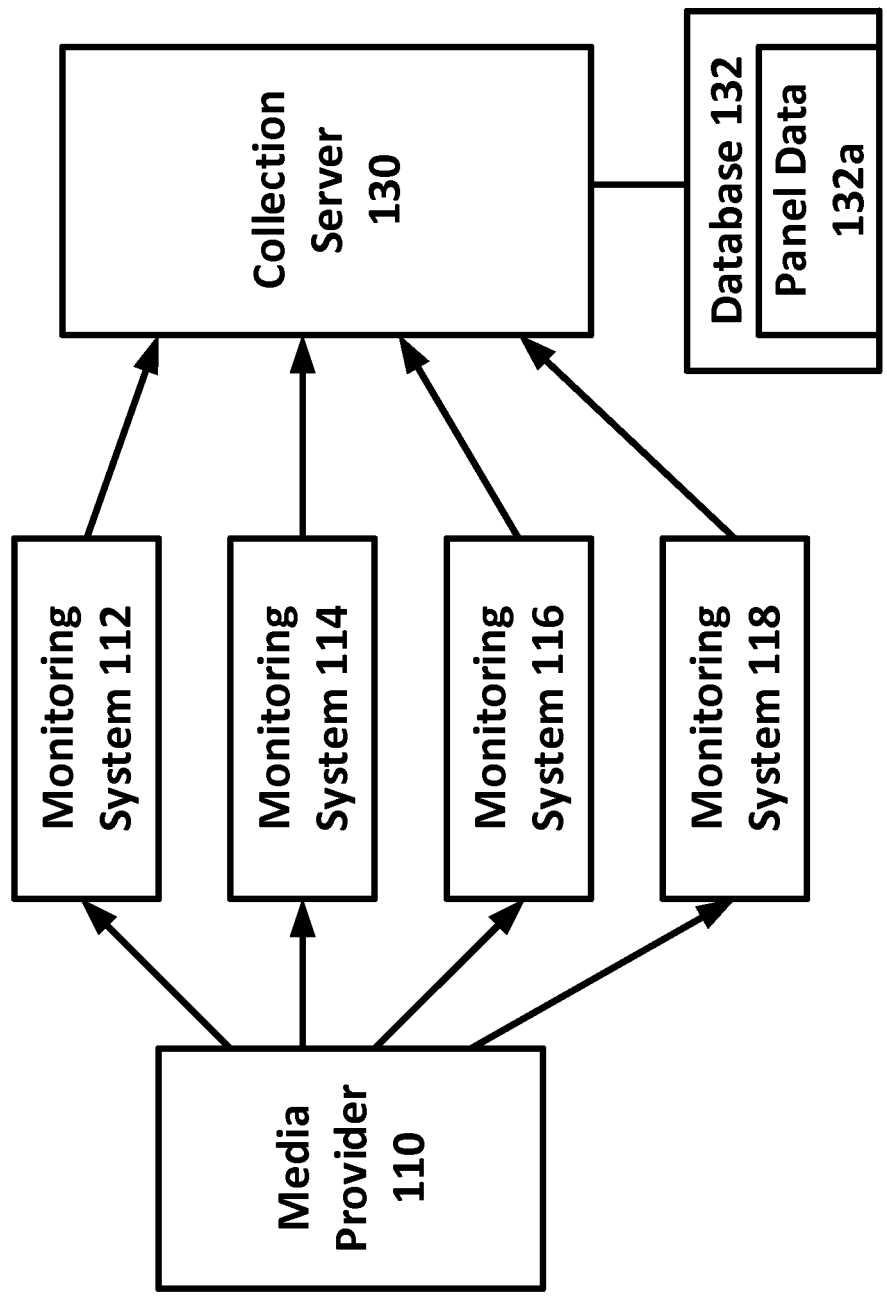
FIG. 1 is a block diagram of an example of a system in which a panel of users may be used to perform media audience measurement.

Audience measurement can be used by content providers, advertisers, and others to determine characteristics and behaviors of the audience consuming their respective offerings. For example, an advertiser may use data relating to the age distribution of an audience of a particular piece of content to place a particular advertising campaign with the content because it is believed that the campaign would appeal to a larger percentage of the audience based on the age distribution. As another example, advertisers may want to understand the reach of a particular advertising campaign.

In some cases, audience characteristics may be calculated by observing the consumption activity of a statistically significant number of users that are representative of the population as a whole. These "panelist" users may provide information about themselves, such as their age, income, sex, or other information, and agree to have their media consumption monitored. By observing the network usage of the panelists and determining characteristics and behaviors for them, characteristics and behaviors for larger portions of the audience can be inferred (within a certain margin of error based on the size of the panel relative to the size of the portion of the audience).

Audience measurement may be performed with respect to content that has an audio component. For example, audience measurement may be performed with respect to radio listenership, television viewership, or some other source of audio and/or audiovisual content.

The following describes various techniques that may be used to perform audience measurement with respect to content that has an audio component. As one example, a prospective panelist may have a mobile device, such as a mobile phone, that can execute applications as well as communicate over one or more wired or wireless connections (e.g., GSM, Bluetooth, CDMA, or WiFi). An audience measurement entity may offer the prospective panelist a mobile device accessory that augments or supplements some of the mobile device functionality. For instance, the mobile device accessory may be a mobile device case with extended battery or an external keyboard. In addition to augmenting or supplementing the mobile device functionality, the mobile device accessory is also configured to collect and report information about ambient audio in the presence of the mobile device accessory, while maintaining the privacy. For example, the mobile device accessory, such as a mobile device case, may include components and/or programming that generates an identifier, such as an acoustic fingerprint, of an ambient sound signal and cooperates with the mobile device to transmit the identifier to a collection server with other information (e.g., the identifier of the mobile device accessory and a timestamp of when the sound signal is detected).

Once the prospective panelist has been informed about the collecting and reporting functionality of the mobile device accessory, the prospective panelist may accept the offer, thereby becoming a consenting panelist, and in return the audience measurement entity provides the mobile device accessory to the consenting panelist. As the consenting panelist carries the mobile device and the associated accessory, information about the ambient audio may be collected and reported to the collection server. The information collected from multiple consenting panelists then may be used for audience measurement of certain audio or audio sources, such as particular radio or television programs or stations.

Some or all of the techniques described may provide one or more advantages. For instance, providing a prospective panelist with a mobile device accessory that augments or supplements the mobile device functionality provides a tangible benefit to the prospective panelist, thereby providing an incentive to the prospective panelist to participate in the panel. Employing a mobile device accessory may allow for audience measurement without detrimentally impacting the end-users' experience with their mobile device because most of the functionality for performing audience measurement is off-loaded to the mobile device accessory. As a result, little or no modification to the users' mobile device would be needed to perform the measurement.

Furthermore, employing a mobile device accessory may also allow for the collection of audio information with mobile devices that place limitations on applications, such as limited background processing. Limited background processing may result in an application running in the background being prevented from accessing the mobile device's microphone and therefore hamper the ability to perform continuous monitoring.

In certain instances, pairing the mobile device accessory with a mobile device may allow the audience measurement entity to produce a relatively cheaper monitoring solution. For instance, while much of the functionality may be off-loaded to the mobile device accessory, in some implementations, the mobile device accessory may be designed to leverage some of the existing features of the user's mobile device, such as the cellular radio, GPS, internet connection, or even some of the processing power. This may be reduce the hardware cost for the monitoring device. Furthermore, costly cellular communication for the end-user and/or audience measurement entity may be able to be avoided by transmitting over WiFi or other connection that has a low or fixed cost for data transmission. In addition, the use of the mobile device accessory may allow the monitoring functionality to be included in a device that the user is likely to carry with him or her since it augments or supplements the mobile device, which may reduce or eliminate issues that may be associated with a dedicated monitoring device, such as the user tiring of, or forgetting to, carry the dedicated monitoring device.

FIG. 1 illustrates an example of a system 100 in which a panel of users may be used to perform media audience measurement. The system 100 includes monitoring systems 112, 114, 116, and 118, one or more media providers 110, a collection server 130, and a database 132. In general, the users in the panel possess monitoring systems 112, 114, 116, and 118 capable of monitoring a user's consumption of media, such as a television program. Information about this consumption is sent by each monitoring system 112, 114, 116, and 118 to a collection server 130. This information may be used to understand the media consumption habits of the users, as well as audience demographics of the users consuming the media.

Each of the monitoring systems 112, 114, 116, and 118 may be implemented using, for example, a mobile device and a mobile device accessory. The mobile device accessory may be configured as a monitoring unit dedicated to collecting ambient sounds in the vicinity of a selected audience member carrying the monitoring unit. The monitoring unit may be capable of extracting distinctive features of the collected ambient sound and producing a digital representation of the collected ambient sound. Such a digital representation may be a raw version of the collected sound or only a portion of the captured sound (e.g., a representation of the distinctive features, such as an acoustic fingerprint). The mobile device accessory on its, or in cooperation with the mobile device, sends the digital representation of the ambient sound to the collection server 130.

The mobile devices and mobile device accessories of the monitoring systems 112, 114, 116, and 118 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the components of the monitoring systems 112, 114, 116, and 118.

In the example shown in FIG. 1, the system 100 includes monitoring systems 112, 114, 116, and 118. However, in other implementations, there may be more or fewer monitoring systems. Similarly, in the example shown in FIG. 1, there is a single collection server 130. However, in other implementations there may be more than one collection server 130. For example, each of the monitoring systems 112, 114, 116, and 118 may send data to more than one collection server for redundancy. In other implementations, the monitoring systems 112, 114, 116, and 118 may send data to different collection servers. In this implementation, the data, which represents data from the entire panel, may be communicated to and aggregated at a central location for later processing. The central location may be one of the collection servers.

The users of the monitoring systems 112, 114, 116, and 118 are a group of users that are a representative sample of the larger universe being measured, such as the universe of all television viewers, all Internet users in a geographic region, or all radio listeners within a radio station's broadcast range. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

The users in the panel may be recruited by an entity controlling the collection server 130, and the entity may collect various demographic information regarding the users in the panel, such as age, sex, household size, household composition, geographic region, and household income. The techniques chosen to recruit users may be chosen or developed to help insure that a good random sample of the universe being measured is obtained, biases in the sample are minimized, and the highest manageable cooperation rates are achieved. In some instances, financial or other benefits may be used to recruit users.

The monitoring is explained to the users and, once a user consents to being monitored, the user is provided with appropriate monitoring equipment (e.g., a mobile device accessory configured for monitoring) to collect the information about the user's interaction with media (e.g., television, radio, video-on-demand, the Internet, etc.) and to send that information to the collection server 130. The collection server 130 receives and records this information. The collection server 130 aggregates the recorded information and stores this aggregated information in the database 132 as panel data 132a.

The panel data 132a may be analyzed to determine the media consumption or other habits of users in the panel, which may be extrapolated to the larger population of all media users. The information collected during a particular time period (session) can be associated with a particular user possessing the monitoring system (and therefore his or her demographics) that is believed or known to possess or be using the monitoring system during that time period. Identifying the individual using the monitoring system may allow the usage information to be determined and extrapolated on a per person basis, rather than a per machine basis. In other words, doing so allows the measurements taken to be attributable to individuals across machines within households, rather than to the machines themselves.

In the above-described example in which the monitoring systems 112, 114, 116, and 118 include a mobile device accessory operating as a monitoring unit, the monitoring unit may be configured to store acoustic fingerprints and periodically transmit the fingerprints along with other relevant information (e.g., the monitoring unit's own identifier) over one or more communication paths to collection server 130. For instance, the monitoring unit may use the cellular or Wi-Fi connection of the mobile device to communicate the fingerprint and other information. The collection server 130 may be configured to examine the acoustic fingerprints together with other relevant information to determine that an audience member associated with a monitoring system has been exposed to a particular piece of media content containing the sound signal identified by the acoustic fingerprint.

Figure 2:
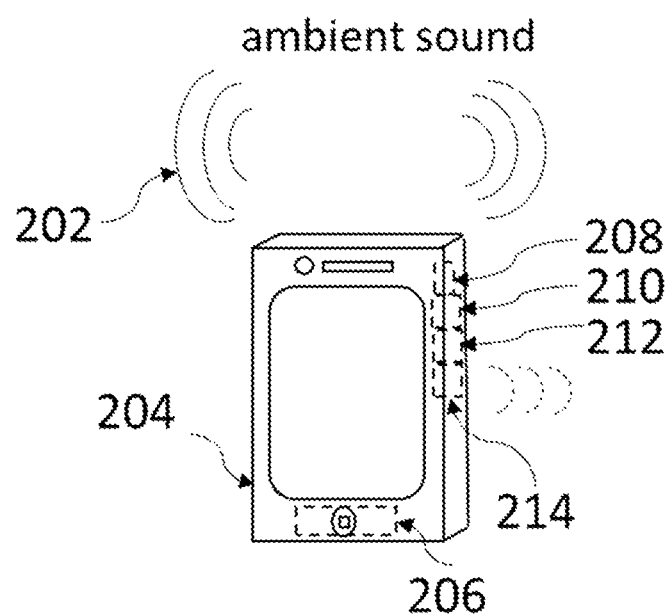
FIG. 2 is an illustration of an example of a mobile device accessory.

FIG. 2 is an illustration of an example of a mobile device accessory consistent with one implementation. A mobile device accessory 204 is provided for integration with a mobile device and monitoring an audience member's exposure to ambient sound 202. The mobile device accessory 204 is in the form of a mobile device case with an extended battery unit, but in other implementations may be a mobile device case, a physical keyboard, a camera enhancement device such as an extended lens, or other accessory. The mobile device accessory 204 comprises a power source 206 for powering at least the mobile device, an audio capturing device 208 for capturing an ambient sound signal, a microprocessor 210 for identifying the distinctive features of the ambient sound signal and generating a digital representation of the distinctive features, a memory 212 for storing the digital representation and other relevant information (e.g., the identifier of the mobile device accessory and the timestamp of when the sound signal is detected), and a transmitter 214 for transmitting the digital representation and the relevant other information for analysis.

The mobile device accessory can have a different size, shape, and/or beneficial functionality (e.g., mobile device protection, battery extension/recharging, camera lens enhancement, addition of a physical keyboard, etc.) for different types of mobile devices. For example, one size and shape may be suitable for phones made by a first manufacturer, another for phones by a second manufacturer, another for tablets, another for laptop computers, and yet another for wearable devices. Depending on the specific size and shape of the mobile device accessory, components 206-214 may have corresponding size and dimensional features to ensure they can be accommodated and do not interfere with each other's operation or the operation of the mobile device. It should be appreciated that the position, size, and shape of the various components in FIG. 2 are for illustration purpose only and may not accurately represent those in an actual implementation.

As described above, with regard to FIG. 1, an entity may be interested in recruiting a panel of users to join a panel for monitoring the users' exposure to media. However, incentivizing users into joining the panel can be difficult and resource intensive. For example, in addition to providing a user with monitoring hardware, the entity may also need to offer users with financial incentives (e.g., discounts at popular retailers). However, because the audience member may use the above-described mobile device accessory 204 like any other accessory, but with the added benefit of being able to track the member's exposure to ambient sounds, an entity interested in monitoring audience members' exposure to media, for example, may offer the mobile device accessory for free or at a discount in exchange for the ability to collect information regarding the audience members' exposure to media. In other words, the mobile device accessory 204 may itself be used as an incentive to recruit users into a panel, and may accordingly reduce the cost of creating the panel.

Figure 3:
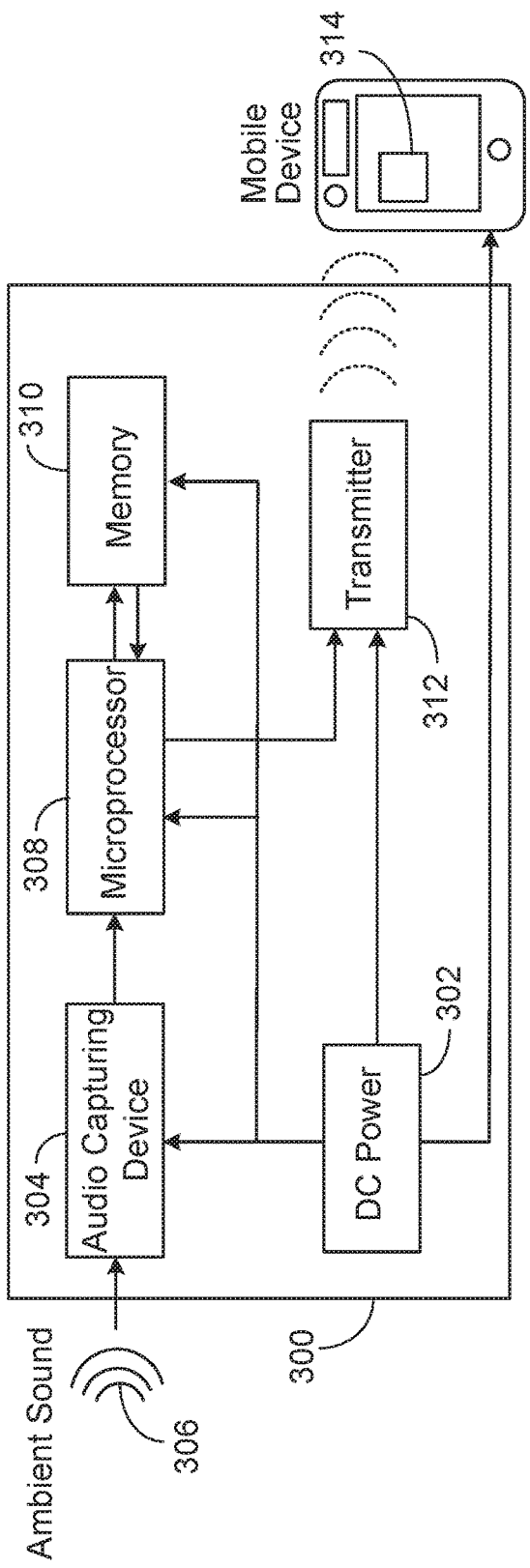
FIG. 3 is a block diagram illustrating the components of an example of a mobile device accessory.

FIG. 3 further illustrates components of an example of a mobile device case with extended battery consistent with one implementation. The mobile device case 300 includes a power source 302 for powering at least the mobile device associated with the accessory. The power source 302 may be a rechargeable battery or any other type of power device (e.g., solar cells). In addition to powering the mobile device, the power source 302 may also serve as an energy source for one or more of the other components of case 300. The mobile device case 300 further includes an audio capturing device 304 for capturing the ambient sound 306 present in the vicinity of the mobile device accessory 300. The source of the ambient sound 306 may be the mobile device itself or a different media receiver located near the mobile device case 300. The audio capturing device 304 may be a microphone or any other appropriate type of device(s) capable of acquiring sound and may be located either internal or external to the mobile device accessory 300.

Once captured, the ambient sound 306 is analyzed by a microprocessor 308, which is coupled to the audio capturing device 304. The microprocessor 308 can be a custom microprocessor, a Field Programmable Gate Array (FPGA), a programmable logic device (PLD), part of an Application-Specific Integrated Circuit (ASIC), or any other type of device capable of executing programmable logic. The microprocessor 308 is configured to generate a digital representation of the captured ambient sound 306. As discussed above, such a digital representation may be a raw version of the collected sound or an identifier of the captured sound such as an acoustic fingerprint. Using an acoustic fingerprint as the digital representation of the captured ambient sound 306 is advantageous because it protects privacy by only storing and transmitting data that may be encoded in a manner that prevents unauthorized third parties from identifying the ambient sound 306, takes up less memory, and requires less processing so it is less resource intensive. Such an acoustic fingerprint can take many forms including but not limited to a hash code, a vector, or a digital digest.

The algorithms for extracting the acoustic fingerprint may be programmed into the microprocessor 308 or stored on a storage device and capable of being executed by the microprocessor. Any suitable audio fingerprinting algorithm may be used (e.g., algorithms that rely upon average zero crossing rate, estimated tempo, average spectrum, spectral flatness, prominent tones across a set of bands, bandwidth, etc.). In some implementations, microprocessor 308 may use one or more different types of algorithms, which may be selected by either the microprocessor 308 or software running on the mobile device associated with the mobile device accessory 300 (e.g., an "app" such as described in greater detail below). In some implementations, the microprocessor 308 or the software running on the mobile device may be configured to select or otherwise modify the size of the sample of captured sound used to create the audio fingerprint (e.g., 2 seconds, 10 seconds, etc.).

According to some implementations, once the digital representation is generated by the microprocessor 308, it is stored in a memory 310, which is coupled to the microprocessor 308. The memory 310 may be any type of digital storage device suitable for use in a mobile device case. For example, in some implementations, a flash memory is used. In addition to storing the acoustic fingerprints, the memory 310 may also store other data including but not limited to the identifier for the mobile device accessory, the time when the acoustic fingerprint is collected, and or other metadata about the fingerprint (e.g., the type of algorithm used to create the fingerprint, the length of the sample size, etc.).

The mobile device accessory 300 further comprises a transmitter 312, which is coupled to the microprocessor 308. The microprocessor 308 activates the transmitter 312 to transmit the information stored in the memory 310 to a software application 314 running on the mobile device 314. The transmitter 312 is preferably a short range transmission device such as a Bluetooth transmitter, although other types of transmission devices are suitable (e.g., Wi-Fi, NFC, infrared, and/or a direct wired connection).

The transmission of the information stored in memory 310 to software application 314 may be performed periodically or aperiodically. For example, the transmission may be performed every day at approximately the same time, or may be performed when a certain number of digital representations (and associated information) have been recorded. The transmission may be initiated by either the mobile device accessory 300 or the software application 314.

Subsequent to receiving the information from the mobile device accessory 300, the mobile software application 314 may be configured to transmit some or all of the received information to one or more collection servers for analysis. For instance, the information sent to the collection server may include an acoustic fingerprint, the identifier for the mobile device accessory, the time when the acoustic fingerprint is collected, and other metadata about the fingerprint. The identifier for the mobile device accessory may be associated at the collection server with information about the user of the mobile device accessory that was collected when the user was recruited for the panel. For example, the information may include various demographic information such as age, income, sex, or other collected information.

In certain implementations, the transmission of the received information is carried out immediately upon reception of the information from the transmitter 312. Additionally or alternatively, the mobile software application 314 may perform the further transmission on a predetermined periodic basis or whenever a Wi-Fi connection is available.

In some implementations, the mobile software application 314 may be configured to perform tasks in addition to collecting and uploading the digital representations received from the mobile device accessory 300. For example, as described above, the mobile software application 314 may be configured to control the type of fingerprint algorithm used by the mobile device accessory to create digital representations of ambient sound, control the sample size of the fingerprints to balance accuracy and resource usage, and/or control other operating conditions of the mobile device accessory. Additionally or alternatively, the mobile software application 314 may be configured to collect and send other information available to the mobile device to the one or more collection servers along with the received digital representations. For example, the mobile device application 314 may be configured to access the mobile device's GPS information to ascertain the location at which the media was consumed, and send information representing this location with the digital representation and other information. Such information can be used, for example, by the one or more collection servers to determine whether the user consumed the media content at home or at work. Additionally or alternatively, the mobile software application 314 may be configured to collect and send information about what other applications are being executed by the mobile device (e.g., an application that may be causing the emission of the ambient sounds captured by mobile device accessory, such as a Netflix or Hulu application). Additionally or alternatively, the above-described functionality of the mobile software application 314 may be integrated into existing monitoring applications, such as an application designed to collect information about a user's other interactions with a mobile device (e.g., Internet usage and exposure).

Figure 4:
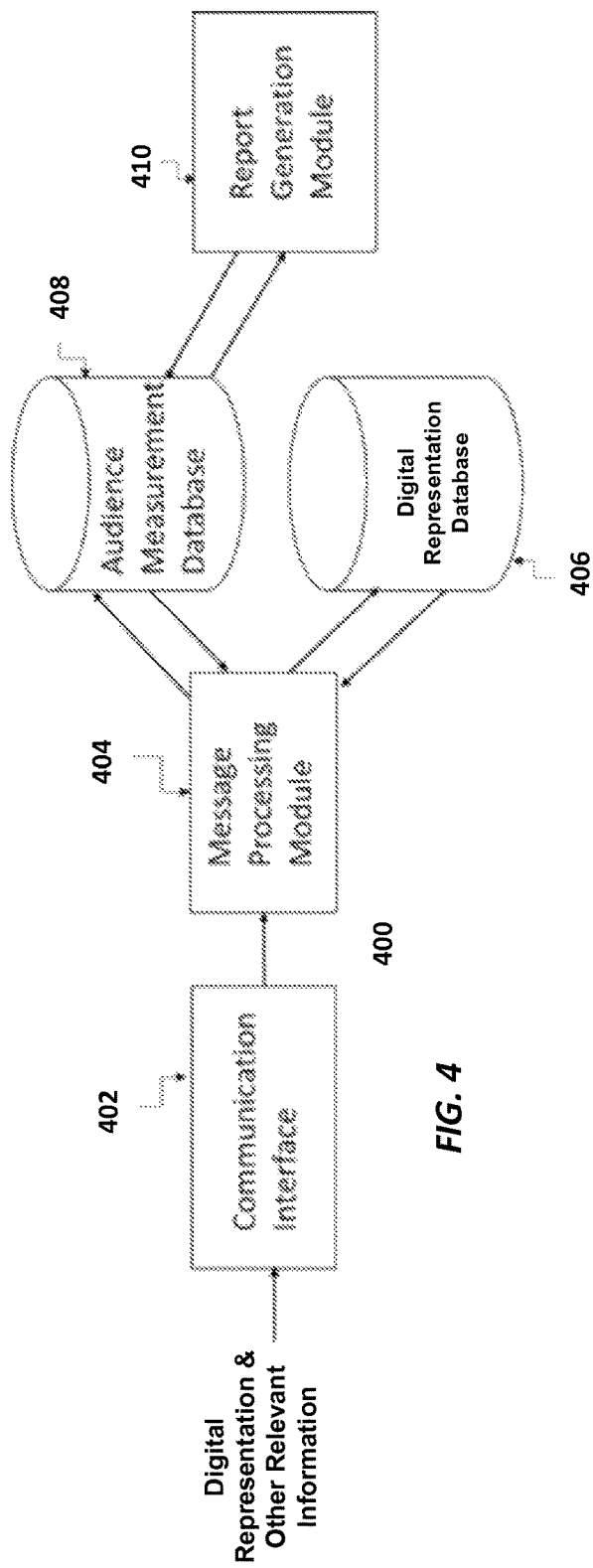
FIG. 4 is a block diagram illustrating an example collection server.

FIG. 4 is an illustration of an example of a collection server consistent with one implementation. The collection server 400 receives digital representations of ambient sound and other relevant information from various mobile software applications via the communication interface 402. As described above with regard to FIG. 1, each of these mobile software applications may be executing on a mobile device of a panel member. In some implementations, the collection server 400 may be configured to receive digital representations of ambient sound and other relevant information from other types of monitoring systems. Moreover, the communication interface 402 may be configured to receive communications via any suitable communication medium (e.g., cellular networks, the Internet, etc.).

The message processing module 404 processes the received digital representations of ambient sound and other relevant information. For example, the message processing module 404 may be configured to pre-process received information by formatting/reformatting, filtering the received information (e.g., removing portions of the received information or discarding the received information altogether if the received information does not meet certain criteria), adding additional data to the received information (e.g., time of receipt, identification information of the collection server that receives the information, data about how the information was received, etc.), or any combination of these functions.

The message processing module 404 compares each received digital representation against information stored in the digital representation database 406. Where the received digital representation is an acoustic fingerprint, for example, the digital representation database 406 may store information against which a received acoustic fingerprint may be compared in order to determine the identity of the sound from which the acoustic fingerprint was generated. Additionally or alternatively, where the received digital representation is a raw audio file, the digital representation database 406 may store information against which a received raw audio file may be compared or the message processing module 404 may be configured to convert the raw audio file into another format (e.g., an acoustic fingerprint) that is then compared against information stored in the digital representation database 406.

In order to compare each received digital representation against information stored in the digital representation database 406, the message processing module 404 may implement a matching routine based on simple equivalency or may implement a more complex statistical analysis that determines the information stored in the digital representation database 406 most similar to the received digital representation and identifies this stored information as a match if one or more measures of similarity exceed a threshold level of similarity. In a case where the message processing module 404 is unable to determine a match between the received digital representation and any information stored in the digital representation database 406, the message processing module 404 may be configured, for example, to discard the received digital representation or to flag the received digital representation for further processing (e.g., by manually or automatically using the received digital representation to expand or modify the information stored in the digital representation database 406 to account for the lack of a match). Additionally or alternatively, in some implementations, where the message processing module 404 is unable to determine a match between the received digital representation and any information stored in the digital representation database 406, the message processing module 404 may be configured to use the received digital representation to query other services or databases to determine an identity of the sound from which the digital representation was generated (e.g., other publically or commercially available sounds identification services or databases maintained by the same or other entities).

Based on the comparison, the message processing module 404 may be configured to make certain determinations about the received digital representation. For example, if the message processing module 404 determines that the received digital representation matches information stored in the digital representation database 406, the message processing module 404 may be configured to determine that the reporting mobile device accessory has been exposed to sound associated with identification information stored in the digital representation database 406 (e.g., a particular source, such as a piece of media content).

In addition to attempting to determine further information about the received digital representation, the message processing module 404 also matches the received digital representations of ambient sound and other relevant information to a particular user based, for example, on information stored in the audience measurement database 408 or a similar data storing apparatus. In some implementations, for example, the message processing module 404 may be configured to compare mobile device accessory ID included with the received digital representation against a list of known mobile device accessory IDs stored in the audience measurement database 408 to determine the particular audience member associated with the mobile device accessory ID. In some implementations, the audience measurement database 408 or a similar data storing apparatus may store profiles for each particular audience member in a panel of audience members.

Notably, information stored in the audience measurement database 408 is anonymized so as not to actually identify a particular audience member with any personally identifying information (PII), and thus maintains each audience member's privacy. The audience measurement database 408 may be configured to anonymously track audience member's using, for example, anonymized tracking IDs (e.g., the mobile device accessory IDs or another ID that is unrelated to PII) that are associated with an audience member's non-personally-identifying information (e.g., certain demographic information), such that no unauthorized third parties who may gain access to the audience measurement database 408 could identify the audience members.

When the message processing module 404 matches a received digital representation to a particular audience member, the message processing module 404 may update a profile associated with the particular audience member to include information related to the received digital representation (e.g., identification information of the piece of media content associated with the received digital representation, information about the mobile device from which the received digital representation was received, information about the time at which the received digital representation was generated by the mobile device and/or mobile device accessory, one or more portions of the other relevant information received with the digital representation, etc.).

As described above with regard to FIG. 1, because various information is known about panel members (e.g., demographic information), the determination that a certain member of a panel of users has been exposed to a piece of media content may be used to project exposure of that media content to a larger population and/or attribute certain characteristics (e.g., demographic characteristics) to the exposure. Additionally or alternatively, the information about a panel member's exposure to sound associated with a received digital representation may be combined with other information collected about the panel member to inform broader measures and/or determinations about the panel member's consumption habits or activities and how these consumption habits or activities relate to other panel members and/or a broader population of individuals or entities.

In some implementations, the message processing module 406 may be configured to accumulate and store exposure statistics and/or other panel-based information in the audience measurement database 408. The stored information can then be used, for example, by the report generation module 410 to produce reports of audience measurement for certain media content. In certain implementations, the reports thus generated may in return be saved in the audience measurement database 408. For example, the report generation module 410 may be configured to produce estimates of the exposure of particular media content across a given population (for example, a particular demographic break) based on the determined number of panel members who have been determined by the collection server 400 to have been exposed to a sound associated with the particular media content. Estimates of the exposure of particular media content across a given population may be useful, for example, to estimate the efficacy of an advertising campaign and/or determine whether the parameters of an advertising campaign have been satisfied.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:

1. A case for a mobile device, the case comprising:
   a housing configured to attach to a housing of the mobile device;
   a power source configured to provide power to a power source of the mobile device;
   an audio capturing device configured to capture an ambient sound, the audio capturing device being distinct from any audio capturing device of the mobile device;
   a microprocessor coupled to the audio capturing device and configured to:
      receive, from an application running on the mobile device, operating conditions for the case,
      receive, from the application running on the mobile device, an identifier of an algorithm to generate a digital representation of the ambient sound, and
      identify distinctive features of the ambient sound and generate the digital representation of the ambient sound according to the algorithm, the microprocessor being distinct from any microprocessor of the mobile device;
   a memory coupled to the microprocessor and configured to store the digital representation and a timestamp of when the ambient sound was captured by the audio capturing device, the memory being distinct from any memory of the mobile device; and
   a transmitter coupled to the microprocessor and configured to transmit the digital representation and the timestamp to the application running on the mobile device for collection on the mobile device.

2. The case of claim 1, wherein the microprocessor of the case is configured to generate the digital representation of the ambient sound by generating an audio fingerprint of the ambient sound.

3. The case of claim 1, wherein the transmitter is configured to periodically transmit one or more digital representations and timestamps to the application running on the mobile device.

4. The case of claim 1, wherein the power source of the case is further configured to provide power to the audio capturing device of the case, the microprocessor of the case, the memory of the case, and the transmitter.

5. A system, comprising:
   a mobile device comprising:
      a power source;
      a microprocessor;
      a Global Positioning System unit
      a transmitter; and
      a storage device storing an application that, when executed by the microprocessor, causes the microprocessor to:
         forward operating conditions to an accessory coupled to the mobile device,
         forward an identifier of an algorithm to generate a digital representation of ambient sound to the accessory,
         receive the digital representation of the ambient sound and a timestamp of when the ambient sound was captured,
         append, via the Global Positioning System unit, a location at which the ambient sound was captured,
         append internet usage and exposure of the user of the mobile device, and
         transmit, using the transmitter, the digital representation, the timestamp, the location, and the internet usage and exposure to a collection server for analysis;
   the accessory coupled to the mobile device, the accessory comprising:
      a power source configured to provide power to the mobile device by charging the power source of the mobile device;
      an audio capturing device configured to capture an ambient sound;
      a microprocessor coupled to the audio capturing device and configured to:
         receive, from the application executed by the mobile device, the operating conditions for the accessory,
         receive, from the application executed by the mobile device, the identifier of the algorithm to generate the digital representation of the ambient sound, and
         identify distinctive features of the ambient sound and generate the digital representation of the ambient sound according to the algorithm;
      a memory coupled to the microprocessor of the accessory and configured to store the digital representation and the timestamp of when the ambient sound was captured by the audio capturing device; and
      a transmitter coupled to the microprocessor of the accessory and configured to transmit the digital representation and the timestamp to the application executed by the microprocessor of the mobile device for collection in the storage device of the mobile device; and
   the collection server being configured to:
      receive the digital representation, the timestamp, the location, and the internet usage and exposure transmitted by the transmitter of the mobile device; and
      determine, based on the received digital representation, the timestamp, the location, and the internet usage and exposure, that a user associated with the accessory was exposed to a particular piece of media content,
      wherein the collection server is different from the mobile device and the accessory.

6. The system of claim 5, wherein the microprocessor of the accessory is configured to generate the digital representation of the ambient sound by generating an audio fingerprint of the ambient sound.

7. The system of claim 5, wherein the transmitter is configured to periodically transmit one or more digital representations and timestamps to the application executed by the microprocessor of the mobile device.

8. The system of claim 5, wherein the power source of the accessory is further configured to provide power to the audio capturing device, the microprocessor of the accessory, the memory, and the transmitter of the accessory.

9. The system of claim 5, wherein the application, when executed, causes the mobile device to transmit information about the mobile device, and wherein the collection server associates the transmitted information about the mobile device with a profile of the user associated with the accessory.

10. A method for estimating audience exposure to media content using a mobile device case coupled to a mobile device, the mobile device case comprising a power source configured to provide power to a power source of the mobile device, an audio capturing device, a microprocessor, a memory, and a transmitter, wherein the audio capturing device, the microprocessor, and the memory are distinct from any audio capturing device, microprocessor, and memory of the mobile device, the method comprising:

receiving, from a user of the mobile device, permission to collect information regarding exposure to media by the mobile device case;

receiving, from an application running on the mobile device, operating conditions for the mobile device case;

receiving, from the application running on the mobile device, an identifier of an algorithm to generate a digital representation of ambient sound;

capturing the ambient sound with the audio capturing device of the mobile device case;

identifying, with the microprocessor of the mobile device case, distinctive features of the ambient sound and generating the digital representation of the ambient sound according to the algorithm;

storing the digital representation and a timestamp of when the ambient sound was captured by the audio capturing device in the memory of the mobile device case;

transmitting, with the transmitter of the mobile device case, the digital representation and the timestamp to the application running on the mobile device for collection on the mobile device; and transmitting, using the application running on the mobile device, the digital representation and the timestamp to a collection server, wherein the collection server is different from the mobile device and the mobile device case.

11. The method of claim 10, wherein generating the digital representation of the ambient sound comprises generating an audio fingerprint of the ambient sound.

12. The case of claim 1, wherein the memory of the case is further configured to store an identifier of the case.

13. The system of claim 5, wherein the memory of the accessory is further configured to store an identifier of the accessory.

14. The method of claim 10, wherein transmitting the digital representation and the timestamp to the collection server comprises periodically transmitting one or more digital representations and timestamps to the collection server.

15. The method of claim 10, wherein transmitting the digital representation and the timestamp to the collection server comprises transmitting the digital representation, the timestamp, and an identifier of the mobile device case to the collection server.

16. The system of claim 5, wherein the collection server is further configured to associate the user that was exposed to the particular piece of media content with demographics for that user.

17. The case of claim 1, wherein the microprocessor coupled to the audio capturing device is further configured to receive, from the application running on the mobile device, a sample size of the digital representation of the ambient sound.

18. The system of claim 5, wherein the application, when executed by the microprocessor, further causes the microprocessor to forward a sample size of the digital representation of the ambient sound.

19. The method of claim 10, further comprising receiving, from the application running on the mobile device, a sample size of the digital representation of the ambient sound.

20. The method of claim 10, further comprising transmitting, to the collection server, a location at which the ambient sound was captured and internet usage and exposure of the user of the mobile device.

* * * * *